Aug. 18, 1936.  E. A. MARSH ET AL  2,051,565
METHOD AND APPARATUS FOR WEIGHING AND PACKAGING MATERIAL
Filed June 22, 1931    8 Sheets-Sheet 2
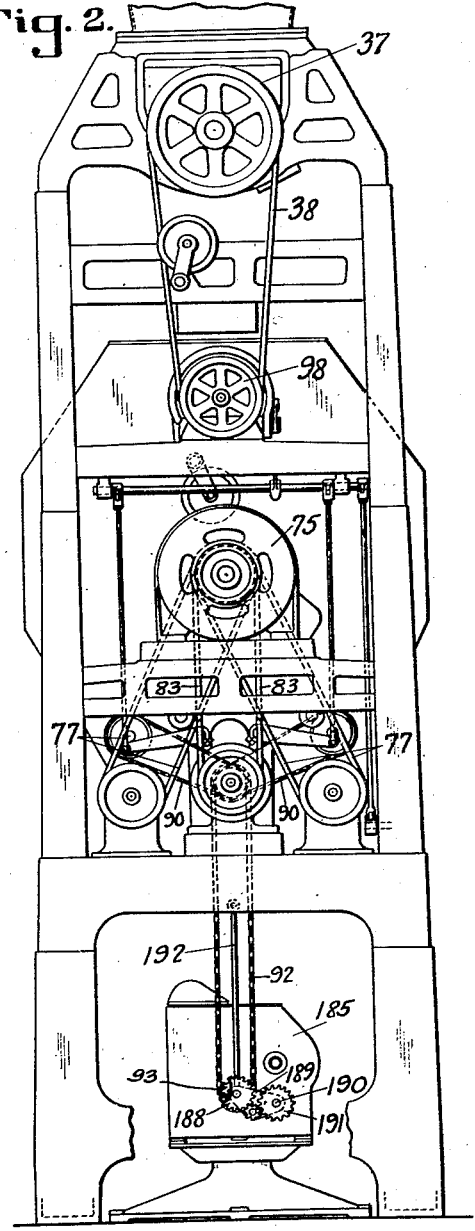
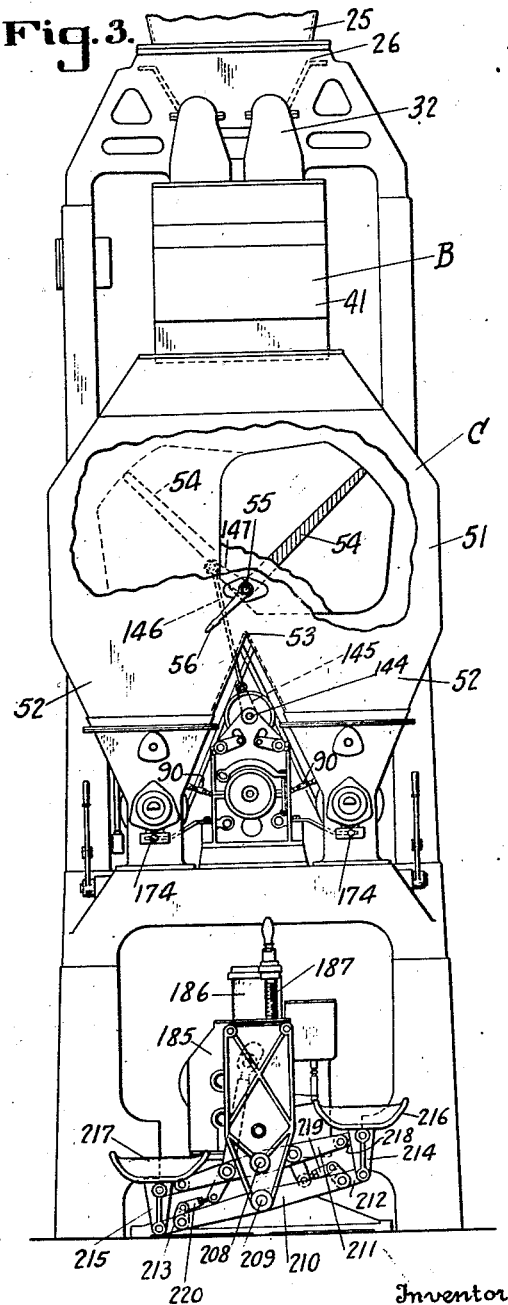
Inventor
Esli A. Marsh
Alfred M. Schlaegel
By
Attorneys Aug. 18, 1936. E. A. MARSH ET AL 2,051,565
METHOD AND APPARATUS FOR WEIGHING AND PACKAGING MATERIAL
Filed June 22, 1931 8 Sheets-Sheet 3

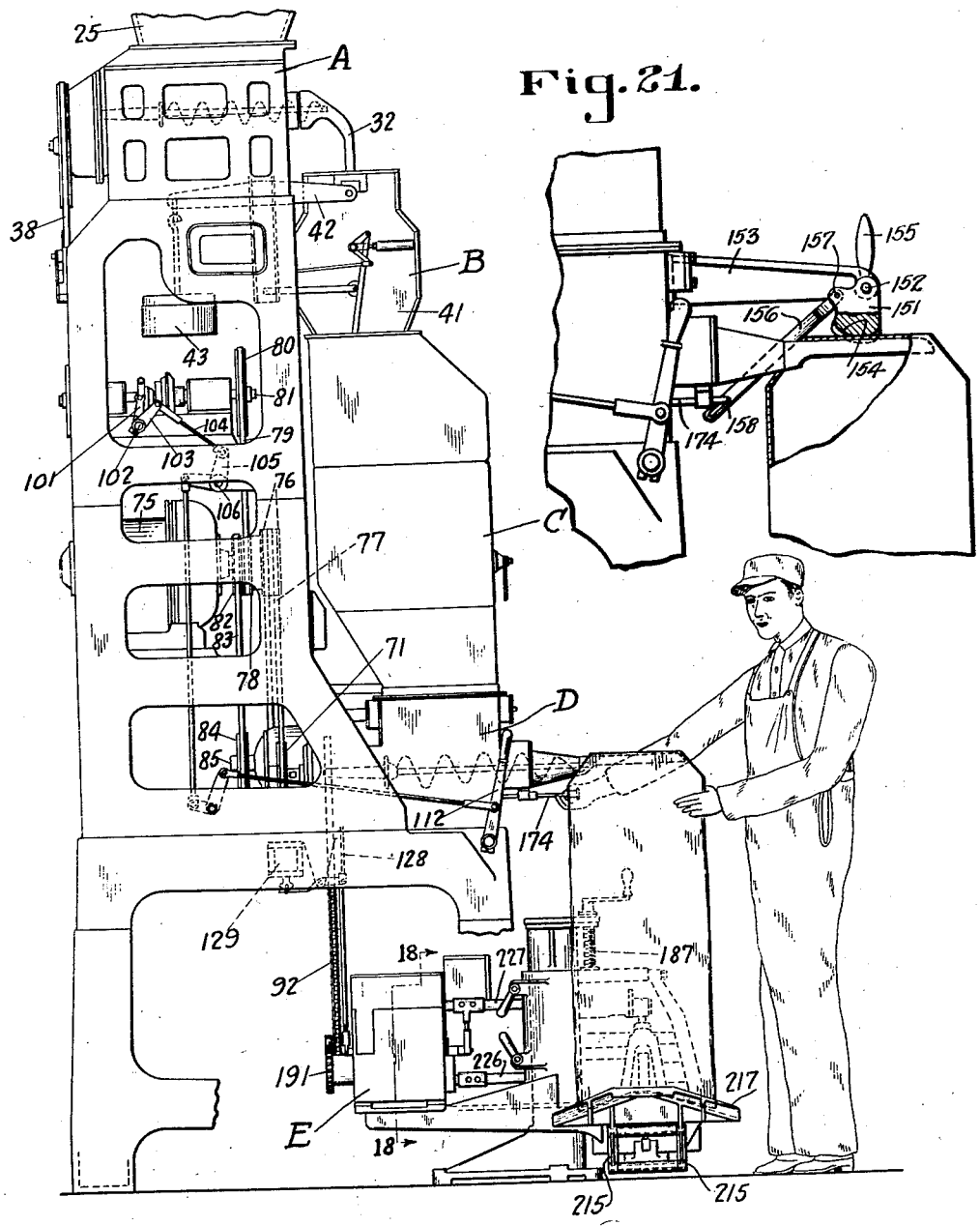

Inventor
Esli A. Marsh
Alfred M. Schlaegel
By Owen & Owen
Attorneys

Aug. 18, 1936.  E. A. MARSH ET AL  2,051,565
METHOD AND APPARATUS FOR WEIGHING AND PACKAGING MATERIAL
Filed June 22, 1931  8 Sheets-Sheet 4
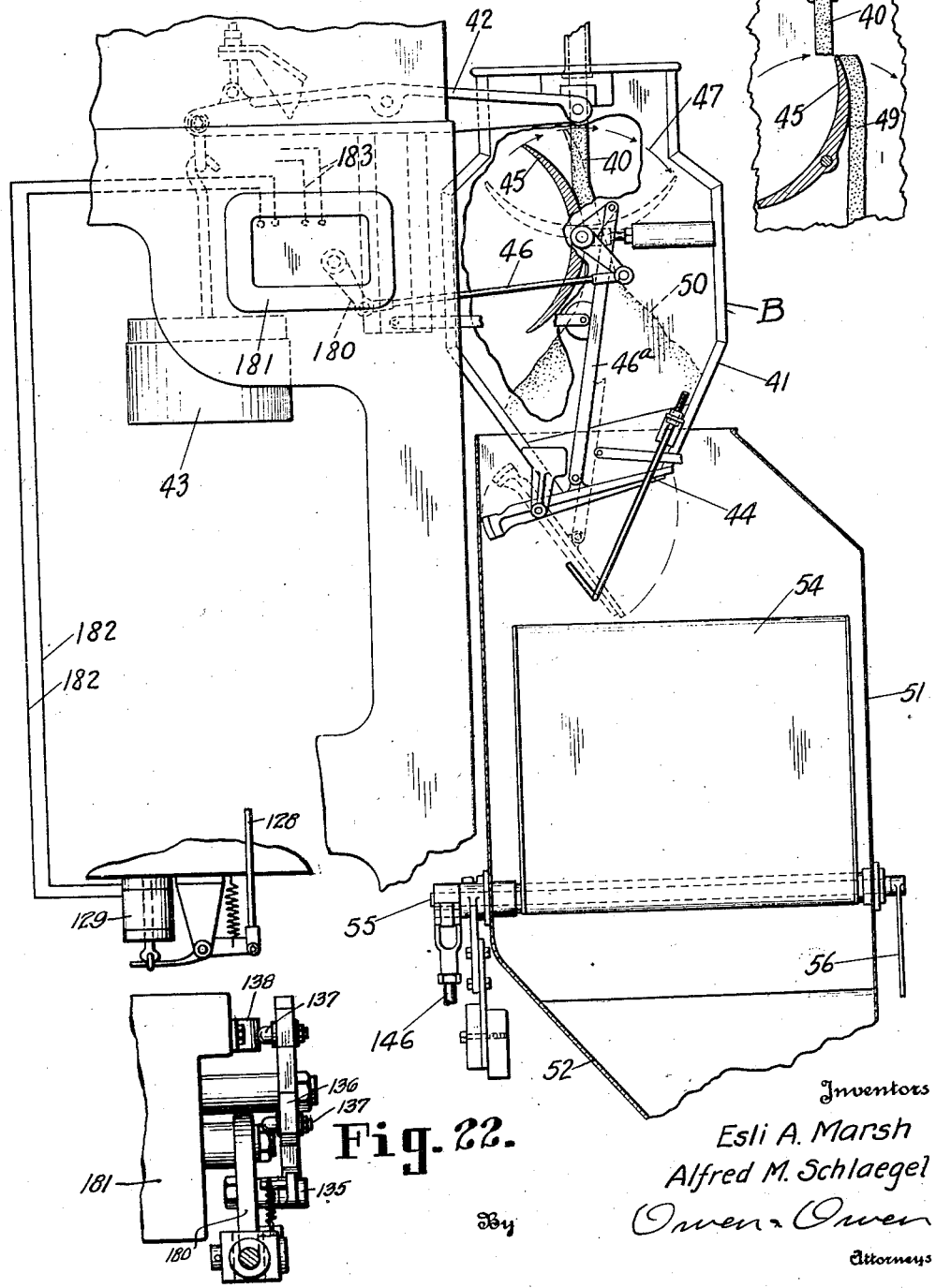
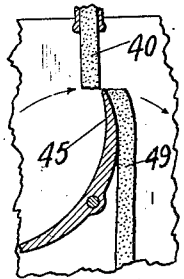
Inventors
Esli A. Marsh
Alfred M. Schlaegel
By Owen & Owen
Attorneys

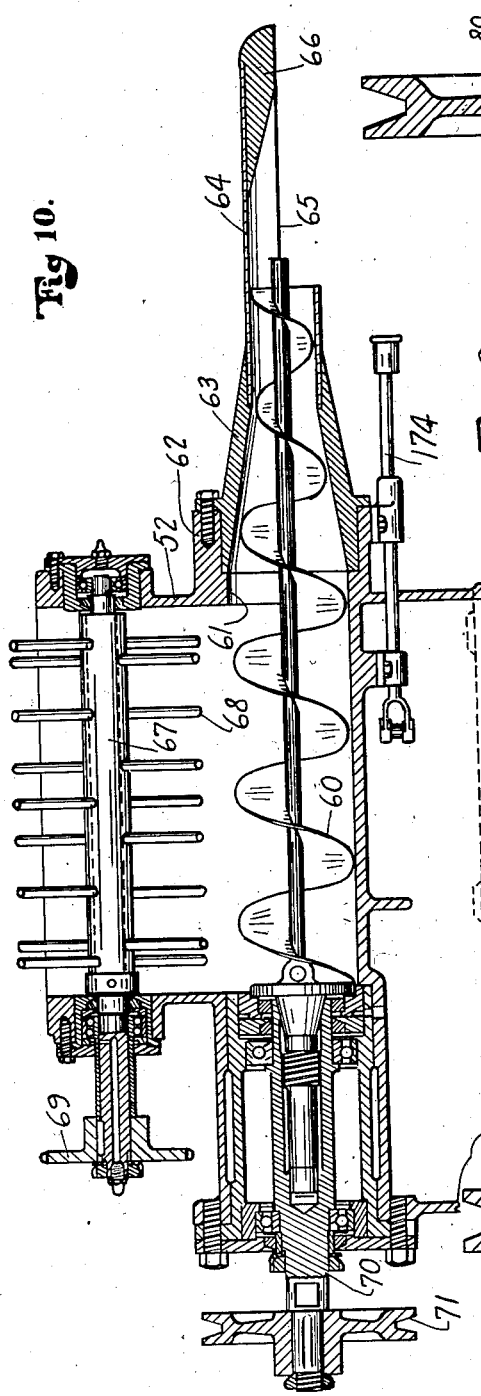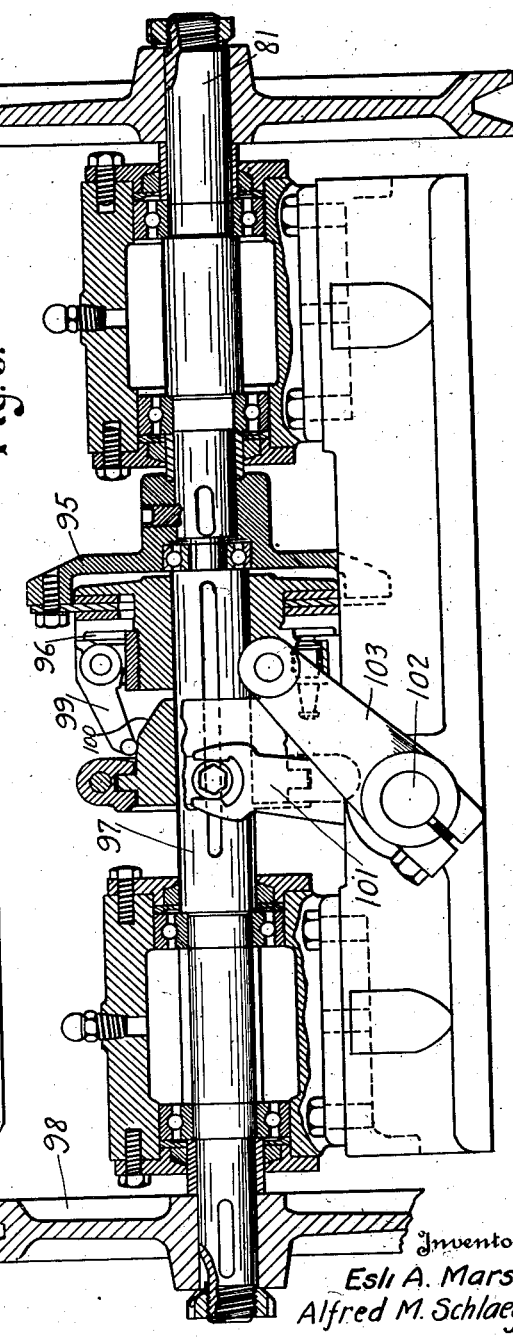

Aug. 18, 1936.  E. A. MARSH ET AL  2,051,565
METHOD AND APPARATUS FOR WEIGHING AND PACKAGING MATERIAL
Filed June 22, 1931  8 Sheets-Sheet 6
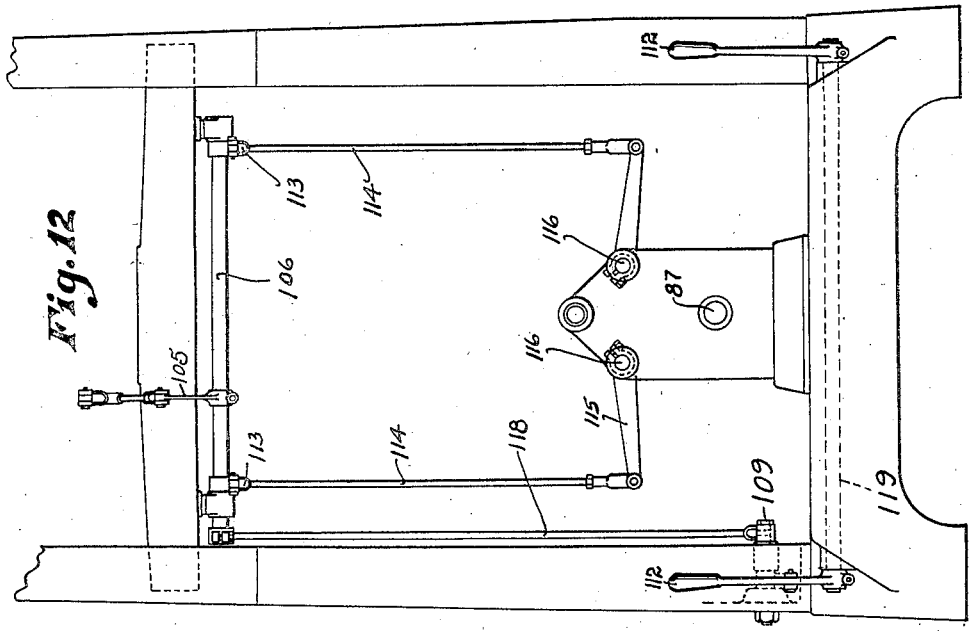
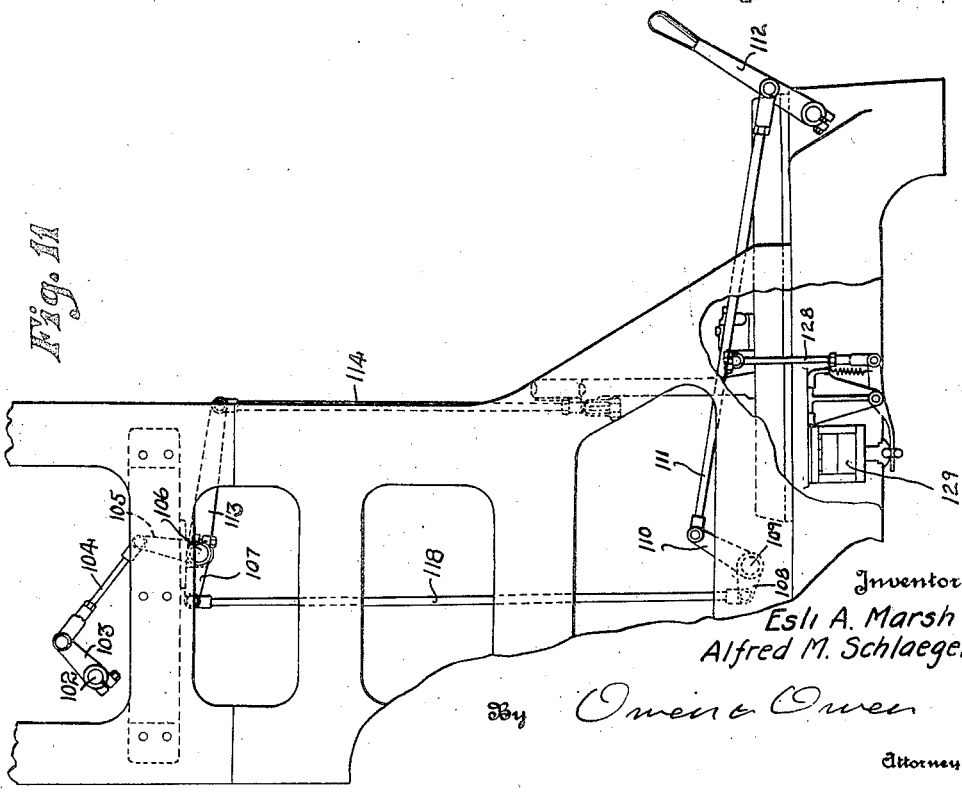
Inventor
Esli A. Marsh
Alfred M. Schlaegel
By Owen & Owen
Attorneys Aug. 18, 1936.　　　E. A. MARSH ET AL　　　2,051,565
METHOD AND APPARATUS FOR WEIGHING AND PACKAGING MATERIAL
Filed June 22, 1931　　　8 Sheets-Sheet 7
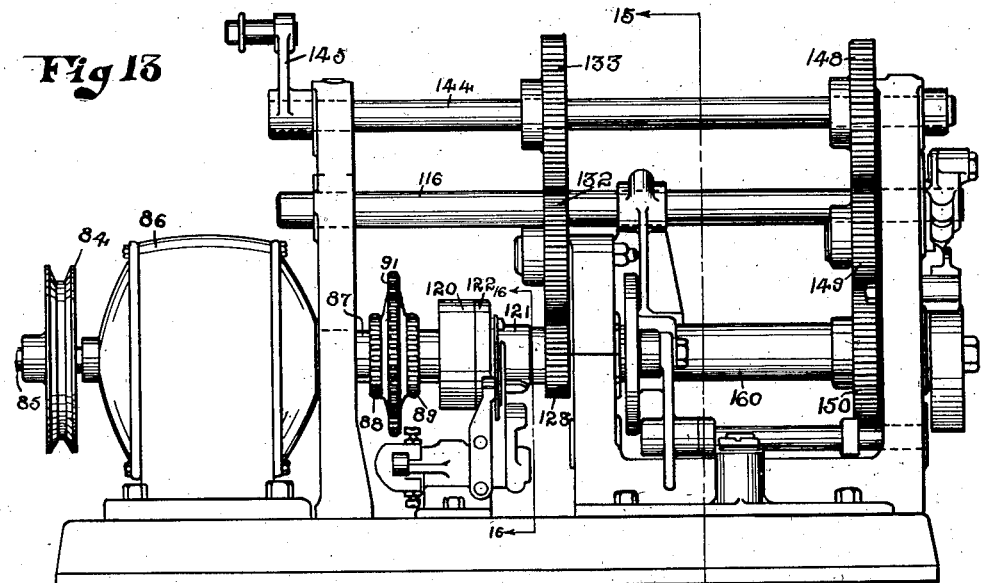
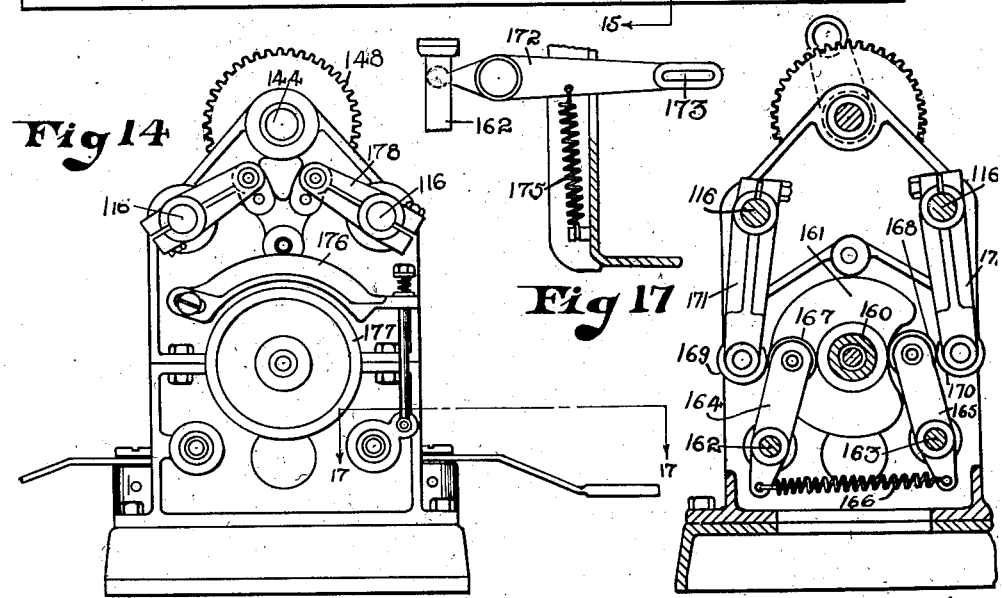
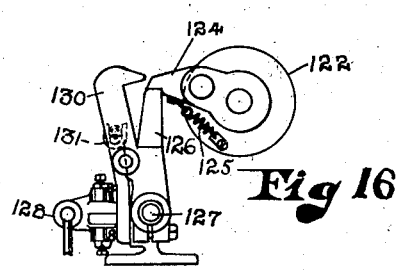
INVENTOR
Esli A. Marsh
Alfred M. Schlaegel
BY
Owen & Owen
ATTORNEYS Aug. 18, 1936.   E. A. MARSH ET AL   2,051,565
METHOD AND APPARATUS FOR WEIGHING AND PACKAGING MATERIAL
Filed June 22, 1931   8 Sheets-Sheet 8
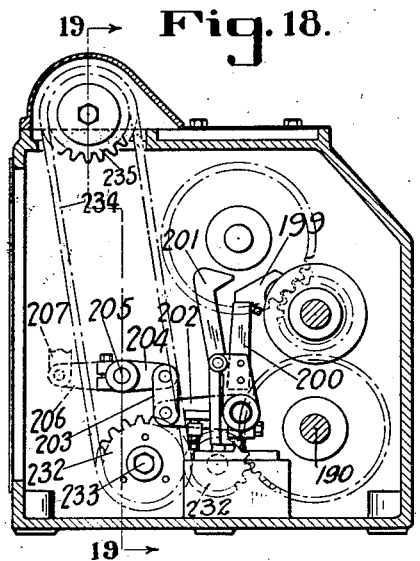
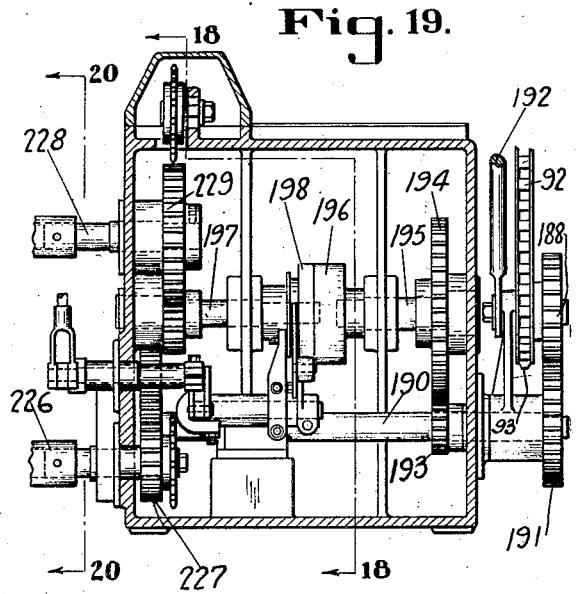
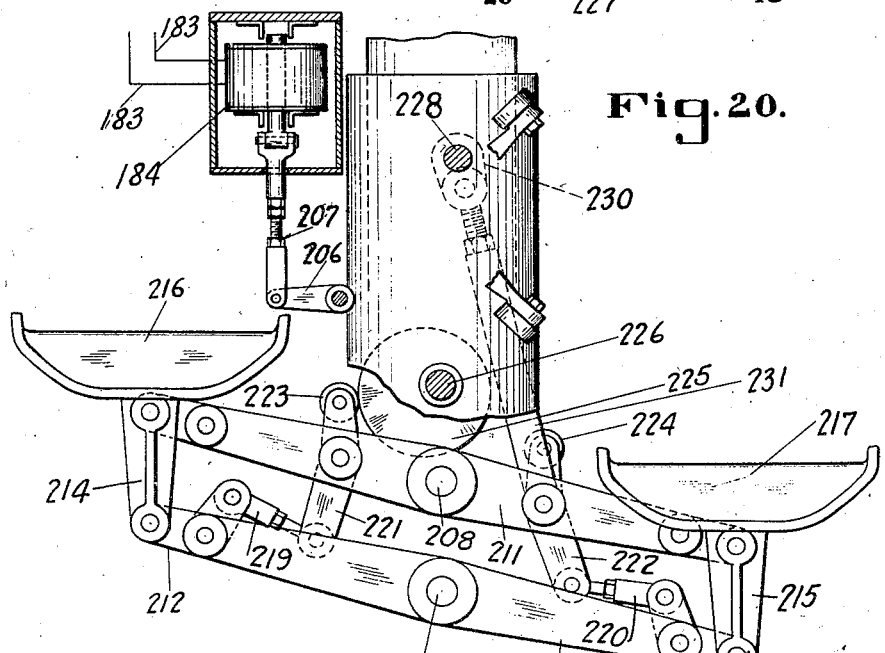
Inventors
Esli A. Marsh
Alfred M. Schlaegel
By Owen & Owen
Attorneys Patented Aug. 18, 1936

2,051,565

UNITED STATES PATENT OFFICE 2,051,565

METHOD AND APPARATUS FOR WEIGHING AND PACKAGING MATERIAL

Esli A. Marsh and Alfred Max Schlaegel, Oswego, N. Y., assignors to St. Regis Paper Company, New York, N. Y., a corporation of New York Application June 22, 1931, Serial No. 546,004

15 Claims. (Cl. 249—60)

This invention relates to weighing and packaging material, and more particularly granular or pulverulent material, such as flour, which is capable of being compacted into a pressed column which will retain its shape against gravity, but can be readily disintegrated into its original condition.

An object of the invention is to provide a method and apparatus whereby charges of material of the kind described can be accurately weighed out and then completely packed into packages, and more particularly into valve bags.

Another object of the invention is to feed material of the kind described into a weighing device in such a way that the feed is substantially constant and may be cut off for successive charges without varying the weight of the charges.

Another object of the invention is to provide apparatus for packaging the weighed charges into bags and so connecting this apparatus to the preweighing device that under normal operations the weighing device is operating continuously, but will be automatically stopped at any time a package is not in position to receive the weighed charge.

Another object of the invention is to insert the material into a bag or other package in compacted form and to jig the package sufficiently to disintegrate the compacted forms of material dropped therein and to completely fill the package.

Another object of the invention is to support and jig the bottom of a bag in such a way that the bottom corners of a gusseted bag will be properly opened up and completely filled. Details of the invention and other minor objects will be disclosed as the description proceeds.

In the accompanying drawings forming a part of this specification—

Figure 1 is a side elevation of the apparatus embodying one form of the invention;

Figure 2 is an elevation of the apparatus viewed from the left of Fig. 1;

Figure 3 is an elevation of the apparatus viewed from the right of Fig. 1 and showing parts broken away;

Figure 7 is an enlarged side elevation of the weighing mechanism and cut-off gate, parts being in section;

Figure 8 is a detail section showing the cut-off gate in a different position from that in which it is shown in Fig. 7;

Figure 9 is a longitudinal section of the driving clutch mechanism for driving the scale feed;

Figure 10 is a longitudinal section through the package feeding device;

Figure 11 is a side elevation showing the operating means for the scale feeding clutch, parts being removed for purposes of illustration;

Figure 12 is an elevation viewed from the right of Fig. 11;

Figure 13 is a detail side elevation of a portion of the drive mechanism;

Figure 14 is an elevation viewed from the right of Fig. 13;

Figures 15 and 16 are sections on the lines 15—15 and 16—16 respectively of Fig. 13;

Figure 17 is a section on the line 17—17 of Fig. 14;

Figure 18 is a section of the jigger drive mechanism on the line 18—18 of Figs. 1 and 19;

Figure 19 is a section on the line 19—19 of Fig. 18;

Figure 20 is a section on the line 20—20 of Fig. 19.

Fig. 21 is a detail view of a bag clamp connected to the tripping rod.

Fig. 22 is a detail showing the switch-closing mechanism operated by the weighing device.

The apparatus shown in the accompanying drawings comprises a compacting and feeding device A which feeds material to an automatic weighing device B which in turn discharges weighed material past a switching device C to bag filling means D. There is also shown a supporting and jigging device E for the bottoms of bags while they are being filled. These parts of the mechanism will be described in detail in the order mentioned.

Figure 4:
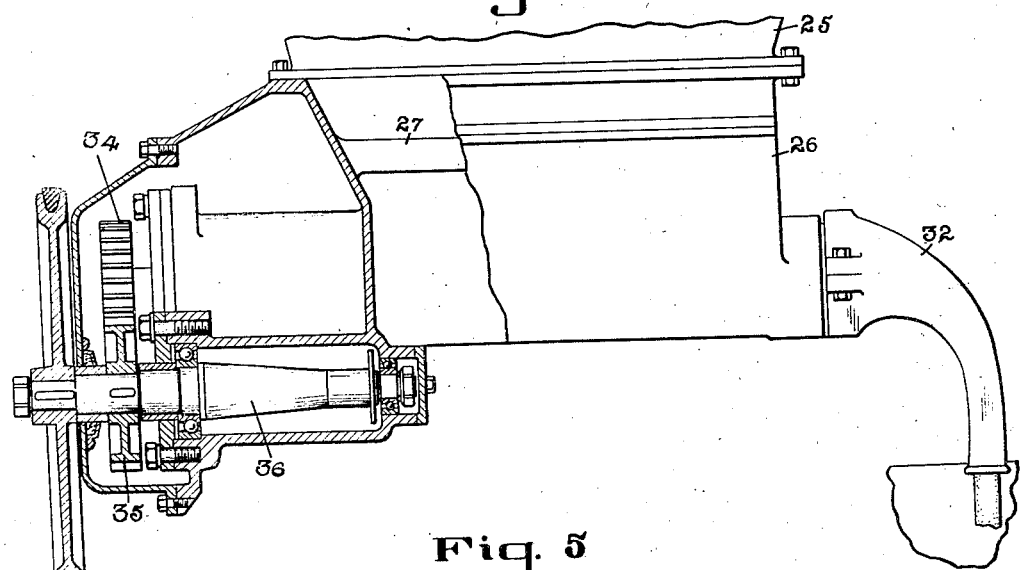
Figure 4 is an enlarged side elevation of the scale feeding portion of the apparatus with parts broken away.
Figure 5:
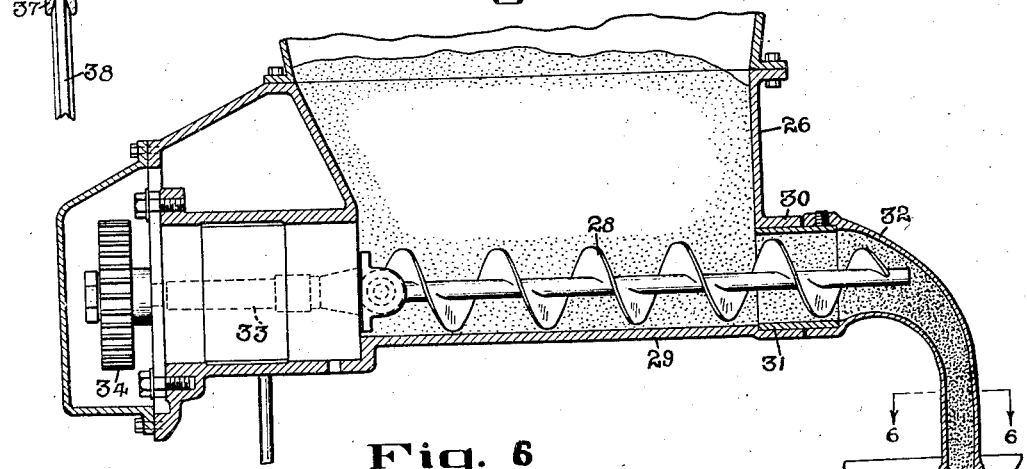
Figure 5 is a longitudinal vertical section of the scale feeding portion of the apparatus.

The detail construction of the scale feeding mechanism is shown in Figs. 4 and 5. There is a spout 25 leading from any suitable source of supply and directing material into the hopper 26 of the scale feeding device. This device is provided with two parallel screws and in the construction shown there is a dividing member 27 in the hopper which aids in directing the material to the two screws.

Figure 6:
Figure 6 is a section of the scale feeding spout on line 6—6 of Fig. 5.

The two screws are similar and, therefore, but one need be described. As shown in Fig. 5 the screw 28 operates in close proximity to the bottom wall 29 of hopper 26 and extends outward through discharge opening 30 of the hopper. Within this discharge opening there is a sleeve 31 which extends outward and receives the upper end of a discharge spout 32. Discharge spout 32 is curved so as to discharge downwardly and as it curves it changes from a circular cross section to a rectangular cross section, as shown in Fig. 6. The total cross sectional area of the spout decreases from its receiving end to the point where it becomes fully rectangular in cross section. Because of this decrease in cross section, and also because of the resistance of the curved direction-change portion of the spout, the material becomes compacted so that a large portion of the air is pressed out of the material and it is packed into a column, as will be more fully explained later.

Each screw 28 is mounted upon a drive shaft 33 driven by a gear 34 meshing with a gear 35 on a shaft 36 between the two screws. Shaft 36 carries a pulley 37 driven by a belt 38, as will be more fully described later.

The compacted columns 40 delivered from the two spouts 32 are directed downward into the weighing device B. This device comprises a container 41 mounted upon scale beam 42 having a suitable weight 43 on the other end thereof. Receptacle 41 is provided with a bottom gate 44 and a cut-off gate 45. This weighing device operates in the well known manner and the details thereof form no part of the present invention. It will be readily understood that when sufficient material has been discharged into receptacle 41 and rests upon the bottom thereof the receptacle moves downward and by means of the controlling devices customary in weighing apparatus bottom gate 44 is swung to its dotted line position in Fig. 7 and at the same time cut-off gate 45 is also swung to its dotted line position by link 46a connecting gate 44 with an arm on the pivot shaft of gate 45. When the upper edge of gate 45 is swung to its dotted line position in the direction of arrows 47 it cuts across column 40, as particularly shown in Fig. 8. The material in the column is pressed so that it is of substantially uniform density, and the uniform speed of the screw extrudes the column at approximately constant speed. When gate 45 moves across the column, it cuts it the short way of the column so that the cutting occurs very quickly. It will be understood that this movement of gate 45 necessarily lags slightly behind the time when sufficient weight has accumulated in the receptacle 41 to cause it to move downward and initiate the movement of the gate. However, this interval is very short. It will also be understood that the portion 49 of the column, between the point where it is cut off and the accumulated mass 50 in receptacle 41, has not exerted downward pressure upon the receptacle prior to the cutting off operation, and, therefore, is an unweighed portion of the charge. In order to obtain a charge of accurate weight, there must be an allowance made for this unweighed addition to the mass which is discharged by the downward swinging of gate 44. The uniform density and speed of the column, together with the quick cut-off resulting from the shape of the column, combine to make this unweighed addition to each charge substantially uniform, so that an automatic weighing device of this kind can be used with flour and such material and obtain more accurate weights than have been possible hitherto with automatic weighing of material of this kind.

Beneath the weighing device there is a hopper and switch. This hopper 51 has two similar parallel downwardly tapering portions 52 and above the point 53 between these downwardly tapering portions there is a switch gate 54 pivoted at 55. It will be readily understood that this gate will direct the weighed charge delivered from the weighing mechanism to one or the other of portions 52 in accordance with its position. The front end of pivot shaft 55 is provided with a pointer 56 so that the operator standing on the front side of the machine can readily see towards which portion 52 the material is being directed. The rear end of shaft 55 is provided with operating mechanism for automatically switching the gate from one position to the other, which mechanism will be described later in detail.

The bottom part of each portion 52 is semi-cylindrical in cross section and there fits therein a screw 60 which extends outward through a discharge opening 61 in the bottom of the portion 52. (See Fig. 10.) In the boss 62 around opening 61 there is fitted a tapering spout 63 into the outer small end of which there fits a filling tube 64 adapted to enter the valve of a bag. The end of screw 60 is tapered to fit within portion 63 and to extend into delivery spout 64. The delivery spout has its discharge end half cut away on the lower side at 65, and in the discharge end there is a deflecting member 66. Screw 60 compresses a column of material through tapering member 63, and this column is deflected downward by member 66 and discharged into a bag, the valve of which is placed over tube 64.

Above screw 60 there is an agitator comprising a shaft 67 having arms 68. Shaft 67 extends outward through the rear portion of the hopper and is driven by a sprocket wheel 69. Screw 60 is driven from a shaft 70 on which there is a pulley 71.

The driving mechanism will be described before the jigger device is taken up in detail.

A motor 75 mounted upon the rear portion of the frame drives a shaft having a plurality of belt wheels. Two of the belt wheels 76 drive belts 77 leading to two pulleys 71. Another belt wheel 78 drives a belt 79 which passes over a pulley 80 on shaft 81. Another pulley 82 drives a belt 83 which passes over a pulley 84 on a shaft 85 midway between the two screws. Shaft 85 runs through a casing 86 (see Fig. 13) in which there may be speed producing gearing if desired. Shaft 87 driven by shaft 85 carries two sprocket wheels 88 and 89 which drive sprocket chains 90 which engage sprocket wheels 69 on the agitating device. Shaft 87 likewise carries a sprocket wheel 91 which drives a chain 92 engaging a sprocket wheel 93 on the jigging device.

Shaft 81 carries the continuously moving member 95 of a clutch (see Fig. 9). Cooperating with this clutch member there is a clutch member 96 on a shaft 97 coaxial with shaft 81. On the other end of shaft 97 there is a belt wheel 98 which drives belt 38 running over pulley 37 of the scale feeding device. Clutch 96 is operated by arms 99 engaging a cone 100 slidably mounted upon shaft 97. An arm 101 mounted on a rock shaft 102 serves to slide cone 100 longitudinally of shaft 97 and open or close the clutch. Rock shaft 102 is provided with an arm 103 connected by a link 104 with an arm 105 on a rock shaft 106. An arm 107 on rock shaft 106 is connected by a link 118 with an arm 108 of a rock shaft 109. Rock shaft 109 carries an arm 110 connected by a link 111 with an operating handle 112 pivoted on a shaft 119 running across the machine, where it carries another arm 112. Rock shaft 106 is also provided with arms 113 connected by links 114 to arms 115 on rock shafts 116 parallel with shaft 87. (See Figs. 11 and 12.)

Shaft 87 also carries a member 120 of a clutch, and coaxial with shaft 87 there is a rotatable member 121 carrying a cooperating clutch member 122 and a gear 123. Clutch member 122 is operated by a pawl 124 normally moved to clutch closing position by a spring 125. A stop 126 is normally in position to stop pawl 124 and open the clutch. Member 126 is mounted upon a pivot 127 and is operated by a rod 128 which leads to a solenoid 129 (see Figs. 1 and 11). Mounted adjacent stop 126 and pivoted thereon is a member 130 swung by stationary fork 131 into stopping position when member 126 is moved outward from stopping position, that is, viewing the parts as shown in Fig. 16, member 126 moves to the left when the top of member 130 moves to the right and vice versa.

Gear 123 is in driving relation with an idler 132 which in turn drives a gear 133 on a shaft 144. On the end of shaft 144 there is a crank arm 145 connected by a rod 146 to an arm 147 on the pivot rod 55 of deflecting gate 54. When crank arm 145 moves rod 146 upward, deflecting gate 54 is moved to its full line position as shown in Fig. 3, and, when crank arm 145 is moved downward, the deflecting gate is moved to its dotted line position in Fig. 3. The gearing is so proportioned that one revolution of member 121 turns shaft 144 through 180°.

Shaft 144 also carries a gear 148 which drives an idler gear 149 meshing with a gear 150 on a sleeve 160 in axial alinement with shaft 87. The end of sleeve 160 towards member 121 carries a cam 161. Slidably mounted below and to each side of sleeve 160 there are rods 162 and 163 which carry arms 164 and 165 connected on their lower ends by a tension spring 166 and having on their upper ends rollers 167 and 168. The rods 162 and 163 are operated by the placing of the bags on the filling tube. When moved in this way rollers 167 and 168 are moved to a position between sleeve 160 and rollers 169 and 170 on arms 171 projecting downward from rock shafts 116, the other ends of which carry arms 115. Rollers 169 and 170 are in position to contact cam 161 when not held outward by rollers 167 or 168 respectively.

Each of rods 162 and 163 is connected, as indicated in Fig. 17, to a lever 172 having in the other end thereof a slot 173 which in turn is connected to a rod 174 which, in the construction shown, projects into the path of a bag as the bag is being placed on a filling tube. If preferred, this rod may be connected to be actuated by a clamping means which clamps the bag upon the tube. As shown in Fig. 21, a bag clamp 151 may be pivoted at 152 in bracket 153, and having an eccentric 154 which may be swung to and from clamping position by handle 155. A link 156 pivoted at 157 to eccentric 154 and at 158 to rod 174 serves to push back the rod when the clamp is moved to clamping position. A spring 175 normally moves the lever to one extreme position, as shown in Fig. 17. The parts connected with clutch 122 are stopped by a brake shoe 176 which is depressed upon a brake wheel 177 by connections 178 from rock shafts 116 when either of those shafts are operated to stop the feeding mechanism.

Connected to a link 46 from an arm on the pivot shaft of gate 45 there is an arm 180 which operates mechanism within a switch box 181. Details of this switch are not shown, but it will be readily understood that the switch is of such construction that connection is made either upon one oscillation of arm 180, or upon a plurality of oscillations of arm 180. One construction for this purpose may be securing on arm 180 a pawl 135 for operating a ratchet wheel 136 which has thereon adjustable and detachable cams 137. If three weighings are desired to a charge, for example, the cams are so adjusted that one of them will slide past and temporarily depress a switch button 138, and thereby close a switch, during each third oscillation of arm 180. Obviously the number and position of the cams may be adjusted to obtain the desired number of oscillations of arm 180 to each closing of the switch. On Fig. 7, there are shown lead lines 182 from switch box 181 to the solenoid 129, previously described. There are also lead lines 183 to a solenoid 184 connected with the device for operating the jigger, as will be described below.

It will be understood from the above description that, after the weighing device has been actuated the desired number of times, solenoid 129 is energized to operate rod 128 and thereby close clutch 122 for one revolution. The result is to turn shaft 144 and sleeve 160 one half revolution and, through crank arm 145, to move the deflecting gate to its opposite position. At the same time cam 161 is turned through one-half of a revolution and, if the respective push rod 174 on that side of the machine has not been actuated by placing a bag in position so as to interpose roller 167 or 168, respectively, the roller on the end of arm 171 drops into the cut away portion of cam 161 and oscillates rod 116 to open clutch 96 through connections previously described. However, if rod 174 has been actuated to interpose the corresponding roller 167 or 168, the actuation of rod 116 does not take place and the feeding shaft continues to operate. This is the normal operation of the machine. If for any reason a bag is not in place at this time, the feeding device will stop until a bag is put in position and the connected handle 112 is actuated to close clutch 96.

The jigging device is mounted in a casing 185 which slides vertically upon a column 186 and may be elevated or lowered with respect to the column by means of a screw 187. In this way, the entire jigging mechanism is bodily raised or lowered to properly adjust it to bags of the length which are being filled.

Sprocket chain 92, as previously described, drives a sprocket wheel 93 on a stub shaft 188 mounted in an arm 189, which is pivoted on a shaft 190 mounted in casing 185. Shafts 188 and 190 are maintained in driving connection by a gear train 191, including a gear on each shaft and an idler gear meshing with both, which turns the two shafts in the same direction. A rod 192 is pivoted on stub shaft 188 and has its upper end connected to a suitable part of the frame of the machine, so that the jigger casing may be raised and lowered without disturbing the driving connection of shaft 190. (See Fig. 2.)

On shaft 190 within the casing (see Fig. 19) there is a gear 193 which meshes with a larger gear 194 on a shaft 195, the other end of which carries a clutch member 196. On a shaft 197 in line with shaft 195 there is a cooperating clutch member 198. This is a one-revolution clutch similar to clutch 122 described above. It is provided with a pawl 199 which opens and closes the clutch, the clutch being opened when the pawl contacts stop member 200 or 201 actuated by an arm 202 connected by a link 203 to an arm 204 on a rock shaft 205. An arm 206 on rock shaft 205 is connected by a link 207 to solenoid 184. By this means shaft 197 is turned through one revolution when solenoid 184 is actuated by the scale mechanism in the manner previously described.

Mounted in front of casing 185, there are stationary pivots 208 and 209 on which there are fulcrumed respectively parallel levers 210 and 211. On the ends of lever 210 there are fulcrumed bell crank levers 212 and 213, the substantially horizontal arms of which are pivoted to the lower ends of supports 214 and 215 of bag jigging members 216 and 217. The upper ends of supports 214 and 215 are connected by similar links 218 to the ends of lever 211. The substantially vertical arms of bell crank levers 212 and 213 are connected by links 219 and 220 to the lower ends of cam levers 221 and 222. The upper ends of levers 221 and 222 carry rollers 223 and 224 which, when elevated, are adapted to contact an eccentric 225 on a shaft 226, which is driven by gearing 227 from shaft 190. Above shaft 226 there is a shaft 228 connected by gearing 229 with shaft 197, the gearing being of such ratio that shaft 228 makes one-half of one revolution to a complete revolution of shaft 197. On the end of shaft 228 there is a crank 230 connected by a link 231 with lever 211.

Viewing Fig. 20, it will be seen that when crank arm 230 is moved through 180° from its position in that figure, bag support or jigger 216 will be lowered and 217 will be raised. It will also be apparent from Fig. 20 that when either bag support is raised the corresponding roller 223 or 224 is positioned so that it will be actuated by eccentric 225. For this reason, the support will be moved up and down by the rocking of the connected bell crank lever 212 or 213, respectively. As will be readily recognized from the drawings, the bag supports are concave, if viewed in the cross-section in a plane parallel with that of Fig. 20, while if viewed in a plane parallel with that of Fig. 1, they are convex.

By this construction of the support the bag is lifted in the middle portion and the corners are allowed to drop down. This fills out the corners of the bags, which is particularly important where the bag is provided with a gusset fold, as this insures proper opening of the gusset at the corner of the bag and the correct shaping of the end of the bag.

Driven from shaft 190 by suitable gearing 232, there is a shaft 233 near the bottom of the casing, which carries a sprocket chain 234 which runs around a sprocket wheel 235 near the top of the casing. This is for the purpose of ensuring the circulation of oil in the casing and improving the greasing operation.

The operation of the device has been described in connection with the description of the various parts, but, for convenience, may be summarized as follows:

Material fed into the hopper 26 through spout 25 is discharged by screws 28 through spouts 32 in the form of compressed ribbons 40. When sufficient weight has been discharged into the weighing pan 41, the pan is lowered and rocks gate 45, cutting off the ribbon very quickly, because it moves across the narrow way of the ribbon. In this way, substantially equal charges are insured at each actuation of the weighing device, as previously described.

The weighing device may be actuated one or several times to weigh out the charge for one bag. However many times it is actuated, the charge for the bag is deflected by gate 54 into one of the downward extensions 52, and from thence is driven outward by the screw into the bag upon the filling tube. Ordinarily, the ribbons will be broken up completely by falling into the scale and from thence into the hopper, but if any compacted portions should remain they are broken up by the agitator above the screw. However, the material is still in a somewhat consolidated condition, and it is further compressed by the tapered end of the discharging screw, so that it is delivered to the bag with a minimum of surplus air therein, whereby a given weight may be driven into a bag of minimum size.

The ribbons may be compressed to such a degree as to substantially maintain their form against the action of gravity, until jarred, so that when cut off, as indicated in Fig. 8, there is substantially a square cut across the column and the column retains a substantially ribbon-like form. Similarly the compressed column discharged into the bag may maintain its form to a certain extent. However, ordinarily it is completely disintegrated by dropping into the bag. The mechanism is so arranged that the bag jigging support is raised slightly after the discharge starts from the screw, which is constantly rotating and discharges material the instant that any is dropped thereupon. The jigger is raised so that it contacts the bottom of the bag and insures the proper opening up of the bottom of the bag and the packing of material therein in a manner which will be readily understood.

Ordinarily the filled bag is removed from the filling tube and another bag is placed thereon while a bag is being filled on the other filling tube, so that, before the deflecting gate is switched back, there is a bag on the filling tube ready to receive material. Under such circumstances, rod 174 is actuated to prevent the opening of the clutch driving the feeding screw. This clutch may be opened at any time by hand lever 112. If a bag is not in position on the filling tube when the charge to the other bag has been completely weighed, the energizing of the solenoid results in automatic opening of the clutch and stopping of the screws feeding material to the scale. Under such circumstances, the weighing part of the mechanism remains idle until the lever 112 is actuated to close the clutch, whereupon the normal operation of the device is continued.

It will be seen from the above that we have constructed a mechanism which will weigh out accurate amounts of material, such as flour, and pack it into bags with a minimum of air, and continue the operation automatically as long as bags are placed upon and removed from the tubes in proper sequence and material is delivered to the mechanism.

It will be understood that various modifications can be made in the several parts of the apparatus and in the driving arrangement therefor within the scope of the appended claims.

What we claim is:

1. The method of dividing out a charge of compactible powdery material such as flour, which consists in compacting the material and feeding it downward in a column that retains its form while being fed but is readily disintegrated into its original powdery condition, stopping the lower end of the column at a predetermined point, crumbling the column as it is stopped, weighing the crumbled portion, cutting the column a predetermined distance above said stopping point when the weight of the crumbled portion reaches a predetermined amount, and dropping the column below the cutting point into the crumbled portion to complete a charge.

2. The method of dividing out a charge of compactible powdery material such as flour, which consists in compacting the material and feeding it downward in a ribbon-like column that retains its form while being fed but is readily disintegrated into its original powdery condition, stopping the lower end of the column at a predetermined point, crumbling the column as it is stopped, weighing the crumbled portion, cutting the column across its thinnest dimension a predetermined distance above said stopping point when the weight of the crumbled portion reaches a predetermined amount, and dropping the column below the cutting point into the crumbled portion to complete a charge.

3. Apparatus for forming weighed charges of compactible powdery material such as flour, which comprises a weighing device, means, comprising a screw conveyor having an outlet broader one way and narrower the other than the screw, for compacting the material into a ribbon-shaped column and feeding it to said device, and means responsive to said weighing device for cutting across the thin way of the column in response to weight of material fed thereto.

4. The method of filling valve bags with compactible powdery material such as flour, which consists in compacting the material and feeding it downward in a ribbon-like column retaining its form while being fed but readily disintegrated into its original powdery condition, stopping the lower end of the column at a predetermined point, crumbling the column as it is stopped, weighing the crumbled portion, cutting the column across its thinnest dimension a predetermined distance above said stopping point when the weight of the crumbled portion reaches a predetermined amount, dropping the column below the cutting point into the crumbled portion to form a charge, completing disintegration of the charge into its original powdery condition, but containing less air, recompacting the charge into a column approximating the cross section of the valve of a bag, feeding the column into a valve bag through its valve opening, and again disintegrating the charge within the bag.

5. A valve bag filling apparatus comprising a weighing device, a receptacle, a spout for delivering material from the receptacle to the weighing device, said spout having a horizontal receiving end with a circular opening into said receptacle and a vertical discharge end with an elongated opening above the weighing device, means for continuously forcing material from the receptacle through said spout, means for cutting the material below said spout across the narrow dimension of said spout, a hopper below the weighing device, means for dumping charges from the weighing device into the hopper, and means for discharging material from the hopper into a valve bag.

6. A valve bag filling apparatus comprising a weighing device, means to compact material into a ribbon-shaped column and feed it to the weighing device, means actuated by the weighing device for cutting off the column of material across the narrow way of the column, a hopper, means for dumping the weighed material into the hopper, an agitator in the hopper, a delivery spout extending horizontally from the lower part of the hopper and adapted to enter the valve of a bag, and means beneath said agitator for driving material into said delivery spout.

7. A valve bag filling apparatus comprising a weighing device, means to compact a column of material and feed it to the weighing device, a stop for said compacting and feeding means, means for actuating said stop by the weighing device, after a predetermined number of weighings, means actuated by the weighing device for cutting off the column of material, a hopper, means for dumping the material into the hopper, a delivery spout extending horizontally from the lower part of the hopper and adapted to enter the valve of a bag, means for driving material from said hopper into said delivery spout, and means actuated upon the placing of a bag upon the filling spout for rendering said stop ineffective.

8. Apparatus for filling valve bags, comprising a self-dumping weighing device, means to feed material to said device, two bag-filling machines, each having a hopper, a switch adapted to guide material dumped by the weighing device into one or the other of said hoppers and means actuating said switch to guide material to the other hopper after it has remained in position to guide material to one hopper while a predetermined number of charges were being dumped.

9. Apparatus in accordance with claim 8, in which the last said means comprises an electrical operating device, an electric switch, and means actuated by a predetermined number of delivering movements of the weighing device to operate said electric switch.

10. Apparatus in accordance with claim 8, in which the last said means comprises an electrical operating device, an electric switch, means actuated by a predetermined number of delivering movements of the weighing device to operate said electric switch, and means operable by said electric switch for stopping the feed to said weighing device.

11. In bag filling apparatus, two filling spouts, means for holding bags in receiving relation to said spouts, and a jigging device comprising contact members positioned beneath said spouts, parallel link mechanism connecting said contact members and pivoted midway between them, means for oscillating said parallel links to raise the contact members alternately, and means for imparting comparatively short vertical movements to the contact member which is raised.

12. Apparatus in accordance with claim 21 and in which the last said means comprises a constantly rotating cam midway between said contact members and connections from each of said contact members bearing a cam roller on its end towards said cam and coming in contact with said cam when the contact member is raised by the parallel link mechanism.

13. Apparatus in accordance with claim 11 and in which the contact member is concave in a cross section substantially at right angles with a plane parallel with the filling spout thereabove, and is convex in a cross section substantially parallel with the filling spout thereabove.

14. The method of filling a valve bag with compactible or powdery material such as flour which normally entraps large amounts of air in its loose condition, which consists in compacting the material, thereafter breaking it up, allowing the air to escape, then re-compacting it into a stream approximately the cross-section of the valve and passing the compacted stream through the valve into the bag to fill the same.

15. The method of weighing out charges and filling valve bags with compactible powdery material such as flour, which consists in compacting the material into a column, feeding the column downward, stopping the lower end of the column at a predetermined point and thereby crumbling the end of the column, weighing the crumbled portion, cutting off the column at a predetermined distance from said stopping point when the weight of the crumbled portion reaches a predetermined amount, allowing the cut off end of the column to fall into the previously weighed portion to form a charge, dropping the charge below said stopping point, disintegrating the dropped charge into its original powdery condition, but containing less air than originally, recompacting it into a stream approximately the cross section of the valve of a bag and passing said recompacted stream through the valve into a bag and thereby placing the weighed and twice compacted charge in the bag.

ESLI A. MARSH.
ALFRED MAX SCHLAEGEL.

CERTIFICATE OF CORRECTION.

Patent No. 2,051,565.                                                                                       August 18, 1936.

ESLI A. MARSH, ET AL.

It is hereby certified that error appears in the printed specification of the above numbered patent requiring correction as follows: Page 5, second column, line 63, claim 12, for the claim reference numeral "21" read 11; and that the said Letters Patent should be read with this correction therein that the same may conform to the record of the case in the Patent Office.

Signed and sealed this 13th day of October, A. D. 1936.

Henry Van Arsdale (Seal)                                Acting Commissioner of Patents.